(12) United States Patent
Lee et al.

(10) Patent No.: US 7,627,577 B1
(45) Date of Patent: Dec. 1, 2009

(54) SYSTEM AND METHOD FOR MAINTAINING AN ASSOCIATION BETWEEN A DISTRIBUTION DEVICE AND A SHARED END USER CHARACTERISTIC

(75) Inventors: Tonia Lee, Tucker, GA (US); Brian Shield, Marietta, GA (US)

(73) Assignee: The Weather Channel, Atlanta, GA (US)

( * ) Notice: Subject to any disclaimer, the term of this patent is extended or adjusted under 35 U.S.C. 154(b) by 486 days.

(21) Appl. No.: 10/677,925

(22) Filed: Oct. 1, 2003

(51) Int. Cl.
*G06F 17/30* (2006.01)
(52) U.S. Cl. ...................................... 707/10; 709/238
(58) Field of Classification Search ............... 707/1–10, 707/100–104.1, 200–205; 709/203, 238
See application file for complete search history.

(56) References Cited

U.S. PATENT DOCUMENTS

| | | | |
|---|---|---|---|
| 6,467,050 B1 | 10/2002 | Aust et al. | |
| 6,549,940 B1 * | 4/2003 | Allen et al. | 709/219 |
| 7,013,289 B2 * | 3/2006 | Horn et al. | 705/26 |
| 7,058,223 B2 * | 6/2006 | Cox | 382/190 |
| 7,428,540 B1 * | 9/2008 | Coates et al. | 707/10 |
| 2002/0032698 A1 * | 3/2002 | Cox | 715/201 |
| 2002/0156917 A1 * | 10/2002 | Nye | 709/238 |
| 2003/0212684 A1 * | 11/2003 | Meyer et al. | 707/10 |

OTHER PUBLICATIONS

Nielsen Media Research: "About Nielsen Media Research," Sep. 15, 2003, pp. 1-3, www.nielsenmedia.com/about_us.html.
Nielsen Media Research: "Directory of Zip Codes by Local Markets," Oct. 1, 2003, p. 1, www.nielsenmedia.com/reports_available/directory_of_zip_codes_by_local_market/zipsbydma.html.
Greatdata.Com: "Nielsen DMA Codes," Sep. 17, 2003, p. 1, www.softwaretools.com/nielsendmacodes.php.
Eric Rothenbuhler: "Market," Sep. 17, 2003, pp. 1-2, www.museum.tv/archives/etv/M/htmlM/market.htm.

* cited by examiner

*Primary Examiner*—Shahid A Alam
(74) *Attorney, Agent, or Firm*—Kilpatrick Stockton LLP (57) ABSTRACT

An association between a distribution device and one or more characteristics shared by the end users served by the distribution device is created and maintained. The characteristics can include end user location, as well as any other type of characteristic or demographic. An initial association between a distribution device and an end user characteristic is created when the device is installed. In one embodiment, the distribution device is a receiver unit and the end user characteristic is viewer location. After installation, a request is made to the end users to provide end user information. The information provided by the end users is used to update and maintain the association between the distribution devices and the shared end user characteristics.

17 Claims, 5 Drawing Sheets

SYSTEM AND METHOD FOR MAINTAINING AN ASSOCIATION BETWEEN A DISTRIBUTION DEVICE AND A SHARED END USER CHARACTERISTIC

TECHNICAL FIELD

The present invention is directed in general to providing targeted information to end users, and in particular to creating and maintaining an association between a distribution device and a common characteristic shared by the end users served by the distribution device.

BACKGROUND

It is currently possible to provide relevant targeted information to recipients using a network, such as a cable television network. The ability to provide relevant targeted information to the appropriate viewers is critical. If too much non-relevant information is presented to a viewer, then the viewer tends to be less attentive to all of the information presented and may miss important relevant information when it is presented.

For example, information about expected severe weather is more relevant to those viewers located within the affected area than those located in remote areas. If viewers receive warnings about any severe weather that is expected, regardless of whether it is expected to affect their location, then the viewers are likely to be less attentive to severe weather warnings and miss a warning about severe weather that is expected to affect their location. In contrast, if viewers only receive warnings about severe weather that is expected to affect their area, then they are more apt to pay attention to the warnings and to take appropriate precautions. Thus, there is a need to ensure that relevant information is delivered to viewers.

One of the problems with current cable television distribution systems is that it is difficult to maintain an association between the distribution devices in the cable television network and the viewers served. The cable television industry has been consolidating so that there are fewer cable operators. Consolidation typically affects the distribution and assignment of distribution devices within the cable television network. When a distribution device is installed at a cable head end, it is assigned to serve certain viewers or viewers located within certain geographic areas. If two cable operations are consolidated, then typically the number of distribution devices is decreased and the number of geographic areas served by a single distribution device is increased. The assignment of the additional geographic areas is not always logical. For example, one or more of the additional geographic areas may be remote from the original geographic areas or geographic areas that would logically be served by a single distribution device are split between two distribution devices. Compounding the problem is that the changes in the assignment of the areas served may not be provided to the content providers who are using the distribution devices to provide relevant targeted content to viewers. Even if the changes in assignment are provided, the information may be not provided timely. Thus, there is a need to create and maintain an association between distribution devices and the areas that they serve that accounts for post-installation changes. The need is not limited to geographic areas served, but applies to any common viewer characteristic that can be used to provide relevant targeted programming.

SUMMARY OF THE INVENTION

The present invention meets the needs described above by providing a system and method for maintaining an association between a distribution device and one or more characteristics shared by the end users served by the distribution device. By maintaining an accurate association, the distribution devices can be used to deliver relevant targeted programming or information to the end users.

When a distribution device is installed, an initial association between the distribution device and the end user characteristics of the end users served is created. The association can be stored in a database by associating a unique ID for each distribution device with the end user characteristics associated with the device.

To maintain the association a manual verification can be performed. For example, if the characteristic is end user location, then a technician determines the geographic areas served by a particular distribution device and updates the database. In addition, information is solicited from the end users to validate, maintain and update the associations stored in the database.

A central system instructs the distribution devices to provide their unique ID's to the end users. The end users receive the unique ID and provide the requested information using any of a number of methods of communication, including entering the information on a website, sending the information via e-mail or mail, or providing the information via telephone. The information received from the end users is used to update the database.

The information may or may not be validated prior to being stored in the database. If the information is not validated prior to being stored, then if the information is later determined to be erroneous, it is deleted or modified. An external source can be used to verify the data.

The database can support a graphical interface that displays the associations between the distribution devices and the end user characteristics. For example, if the database maintains an association between the distribution devices and the geographic areas served, then the graphical interface includes a map that uses different colors or other indicia to identify the areas served by each distribution device.

By supporting the delivery of targeted information or programming, the present invention assists in the efficient utilization and conservation of energy resources. If weather is expected that will place an unusually high demand on energy resources, then those viewers in the areas likely to be affected can be notified and requested to conform their energy usage to recommended guidelines to prevent black outs or brown outs.

The present invention can also assist in the prevention of terrorism. The invention supports the delivery of information based on one or more common characteristics of the end viewers, including the location of the viewers. Thus, if it is determined that there is a threat of terrorism directed to a particular area, then those located in that area can be alerted. Although those outside the area may also be alerted, the warnings can be customized so that those located in the affected area receive more frequent alerts or more specific information about the threat than those outside the area.

These and other aspects, features and advantages of the present invention may be more clearly understood and appreciated from a review of the following detailed description of the disclosed embodiments and by reference to the appended drawings and claims.

DETAILED DESCRIPTION

The present invention is directed towards a method for maintaining an association between a distribution device and one or more characteristics shared by the end users served by the distribution device. In one embodiment, the characteristics include the geographic areas served by the distribution device. However, characteristics other than location, including any type of demographic information, can be used. Briefly described, an initial association between a distribution device, such as a receiver unit, and an end user characteristic, such as viewer location, is created when the device is installed. After installation, a request is made to the end users to provide end user information. The information provided by the end users is used to update and maintain the association between the distribution devices and the shared end user characteristics.

Distribution Network

Figure 1:
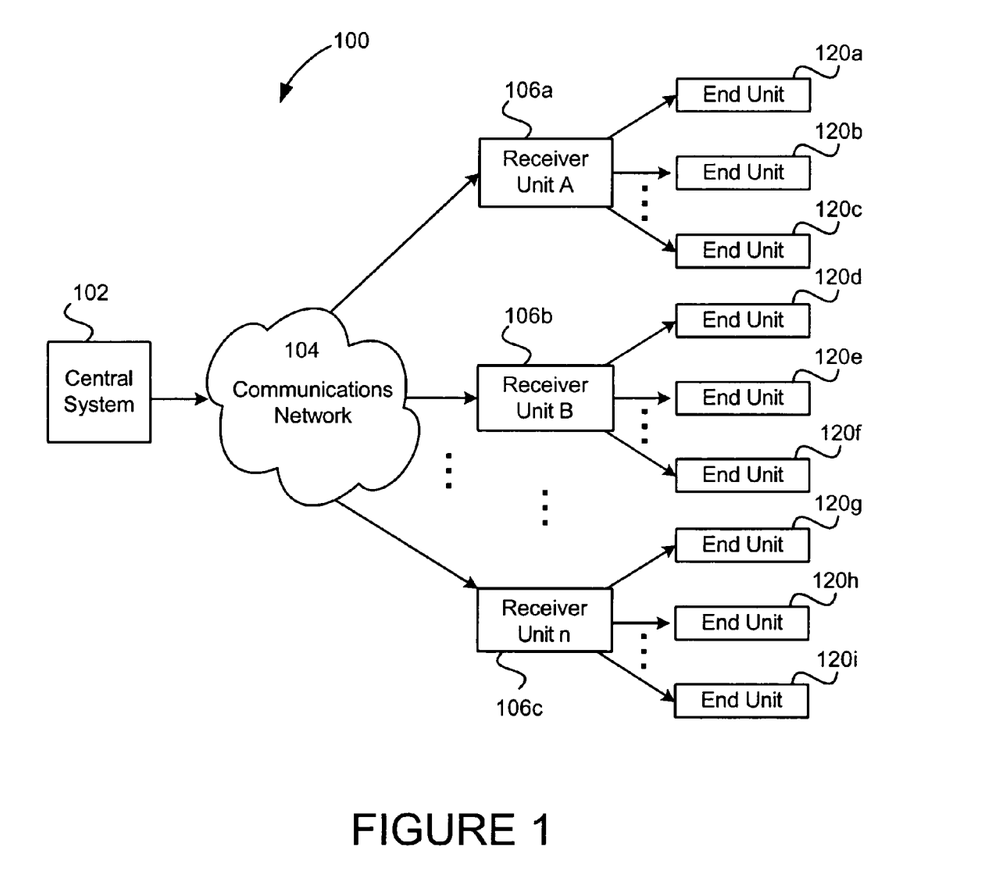
FIG. 1 is a block diagram of an exemplary distribution network in accordance with an embodiment of the invention.

FIG. 1 illustrates an exemplary operating environment for one embodiment of the invention. FIG. 1 illustrates a distribution network 100 having a central system 102 and a number of receiver units, collectively 106. Each receiver unit serves a number of end units, collectively 120. The central system 102 receives content, information, or other material from a variety of sources (not shown). In one embodiment, the distribution network 100 is a cable television network. In this embodiment, the central system 102 receives weather data from weather information providers, such as meteorologists and government and/or private weather information providers, and produces weather programming that it delivers to the receiver units 106. The meteorologists include, but are not limited to, meteorologists that are associated with the entity that produces the weather programming. The information or data received by the central system is not limited to weather information and can include any type of information or programming including news, sports, entertainment, or financial.

As illustrated in FIG. 1, each receiver unit 106 serves a number of end units, collectively 120. The end units are typically associated with a plurality of end viewers and end viewer locations. The end units may correspond to televisions or any other type of device capable of receiving and providing programming at an end viewer location. Typically, the end units are associated with one or more geographic areas, such as zip code areas.

The central system 102 can create original programming from the information received or can simply forward received programming to the receiver units 106. The programming may be in any format, including television or multimedia programming. The central system 102 communicates with the receiver units 106 through a communications network 104. The delivery of programming by the central system can be via a satellite network or any other appropriate communications network. In one embodiment, the receiver units are associated with a cable television system head end. In another embodiment, the receiver units can be associated with an end unit, such as a set top box associated with a television. However, as those skilled in the art will appreciate, the distribution network can include systems other than those illustrated in FIG. 1.

In addition to transmitting content to the receiver units, the central system is also capable of transmitting commands or other instructions to the receiver units. The content and/or instructions can be used by the receiver units in real time or can be stored for later use. Depending upon the capabilities of the receiver units, the central system can broadcast commands to all of the receiver units or can individually address commands to particular receiver units.

In addition to receiving information, the receiver units and/or the end units are capable of transmitting information, such as information about the actual programming provided, back to the central system. As will be discussed in more detail herein, each receiver unit is capable of creating and or delivering its own programming, including programming targeted to the end viewers served by the receiver unit. In the case of such targeted programming it is necessary to maintain a record of the programming provided since the programming will vary based on the receiver unit. For example, if each receiver unit provides targeted advertising based on a characteristic shared by the end viewers is serves, then the record of the programming provided is necessary to determine the appropriate advertising charge.

Association Between Receiver Units and a Common End Viewer Characteristic

In order to provide relevant, targeted programming to end viewers, it is important to create and maintain a record of the common end viewer characteristics associated with the receiver units. The common end viewer characteristics can include any demographic or end viewer characteristic. Multiple end viewer characteristics can be associated with a receiver unit. Multiple end viewer characteristics can accommodate differences in end viewers, such as differences in the locations of the end viewers, or can accommodate multiple characteristics associated with a single end viewer, such as location, age and income level.

Figure 2:
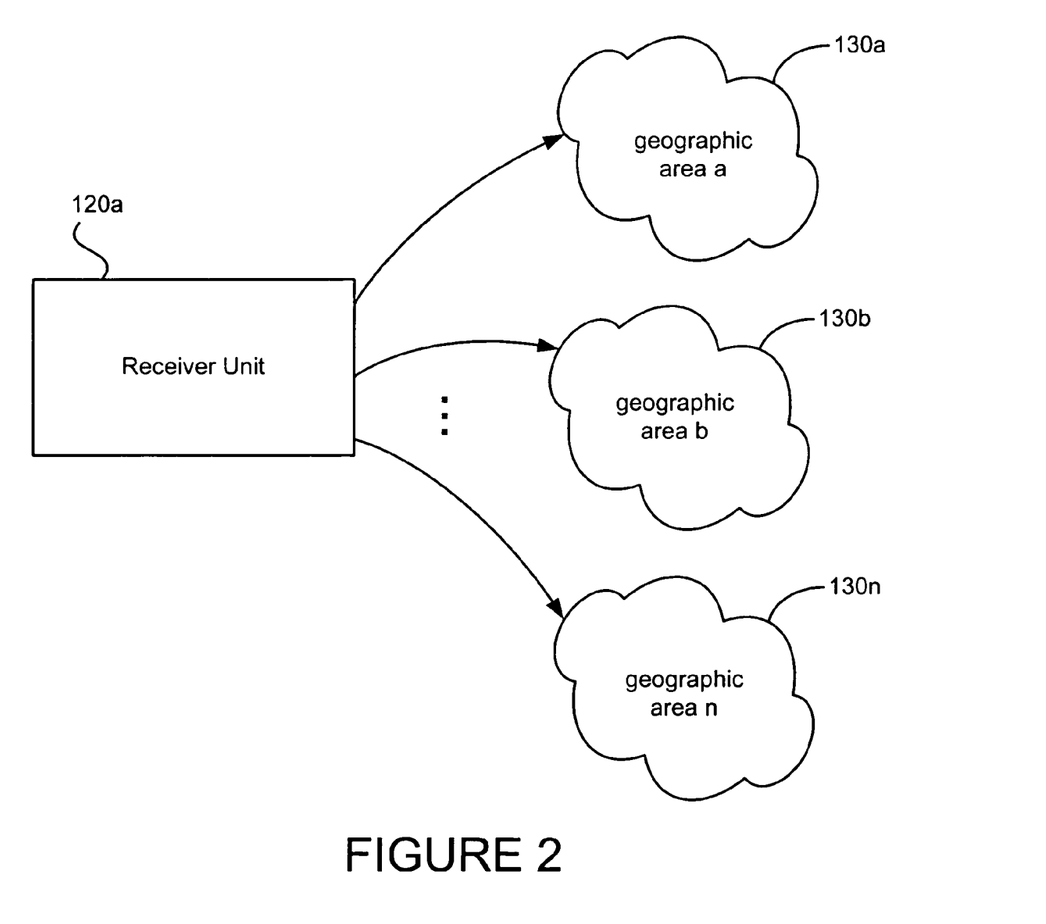
FIG. 2 is a block diagram of an exemplary association between a distribution device and a common end viewer characteristic in accordance with an embodiment of the invention.

In one embodiment, the end viewer characteristic is the location or geographic area of the end viewer. Typically, a single receiver unit serves multiple geographic areas, as shown in FIG. 2. In the embodiment using a cable television distribution network, the geographic areas served by the receiver units are determined by the placement and assignment of receiver units in the cable television head ends. The number of end units served by a receiver unit is independent of the number of geographic areas served. Thus, it is possible that a single receiver unit serves a single geographic area, whereas another receiver unit serves multiple geographic areas. The geographic areas served by a receiver unit may be adjacent to one another or may be non-adjacent.

Although FIG. 2 illustrates that a receiver unit is associated with different geographic areas, the invention is not limited to geographic areas. For simplicity, geographic area is used as an exemplary common end viewer characteristic herein. However, as will be apparent to those skilled in the art, the invention is not limited to geographic areas and can include any type of viewer characteristic or demographic.

Each receiver unit in the network is assigned a unique ID. The unique ID can be used to create and maintain an association between the receiver unit and one or more common end viewer characteristics. In one embodiment, a centrally managed database is used to maintain the association. The database could be part of the central system or could be separate from the central system. In some embodiments, the database is the only place where the association between the receiver units and the end viewer characteristics are stored. In other embodiments, the association between a receiver unit and an end viewer characteristic is stored in multiple locations with the centrally managed database providing periodic updates to the other locations. For example, all of the associations may be stored in the database and individual associations may be stored in each receiver unit.

The database stores an association between the unique ID for each receiver unit and the viewer characteristic(s) associated with that receiver unit. For example, if the viewer characteristic is a geographic area, then the database stores an association between the unique ID for the receiver unit and the geographic areas served. Zip codes or any other type of geographic identifiers, such as longitude and latitude, can be used to identify the geographic areas served. The database can include an association between multiple end viewer characteristics. For example, the database can include geographic areas served, as well demographics, such as ages of end viewers or average household incomes. The demographic data can be obtained directly from the end viewers or can be obtained from other sources. For example, if geographic area information, such as zip code, is obtained from the end viewers, then the demographic data can be obtained from a demographic data provider that provides demographic data for various zip codes. Examples of demographic data providers include Claritas, Scarborough, Simmons and Equifax. The demographic data can be obtained and stored in the centrally managed database or in a separate database, so long as the demographic data is associated with the unique ID for the appropriate receiver unit. Examples of the type of demographic data include, but are not limited to age, sex, income, employment, educational attainment, family structure, race, language, urbanization, housing status, lifestyle and marital status.

When the receiver unit is originally installed, the initial association between the receiver unit and the geographic area served is created. The association can be obtained from the installer, e.g. a head end technician, or from an installation order. To maintain an association for a previously installed receiver unit, a head end technician determines the geographic areas served by a particular receiver unit and provides the information to the database. In one embodiment, the technician provides the information via a web page. In other embodiments, the information is provided via telephone, mail or e-mail. Any form of communication, including e-mail or mail, can be used to request the technicians to obtain the information for previously installed receiver units. In some embodiments, the request is made periodically.

Information solicited from the end viewers is used to validate, maintain and update the association stored in the database. In one embodiment, a promotion is used to solicit information from end viewers. The promotion may entice end viewers to provide information by entering those end viewers that provide information into a drawing for a prize, such as a trip or a television. As will be apparent to those skilled in the art, other types of promotions can be used, including providing each responding viewer with a small prize. The central system provides information publicizing the promotion to the receiver units, which in turn display the information about the promotion to the end viewers. The information instructs the end viewers that a unique ID will be provided at a particular time on a particular channel. If the end viewer provides the unique ID and the requested information, then the end viewer is eligible for the drawing. Additional methods for publicizing the promotion can also be used. For example, information about the promotion can be provided to end viewers via mail, e-mail or telephone.

Each receiver unit provides its unique ID to its end viewers in response to an instruction received from the central system. The end viewers provide the requested information using any of a number of methods of communication, including entering the information on a website, sending the information via e-mail or mail, or providing the information via telephone. The information received from the end viewers is used to update the database.

Figure 3:
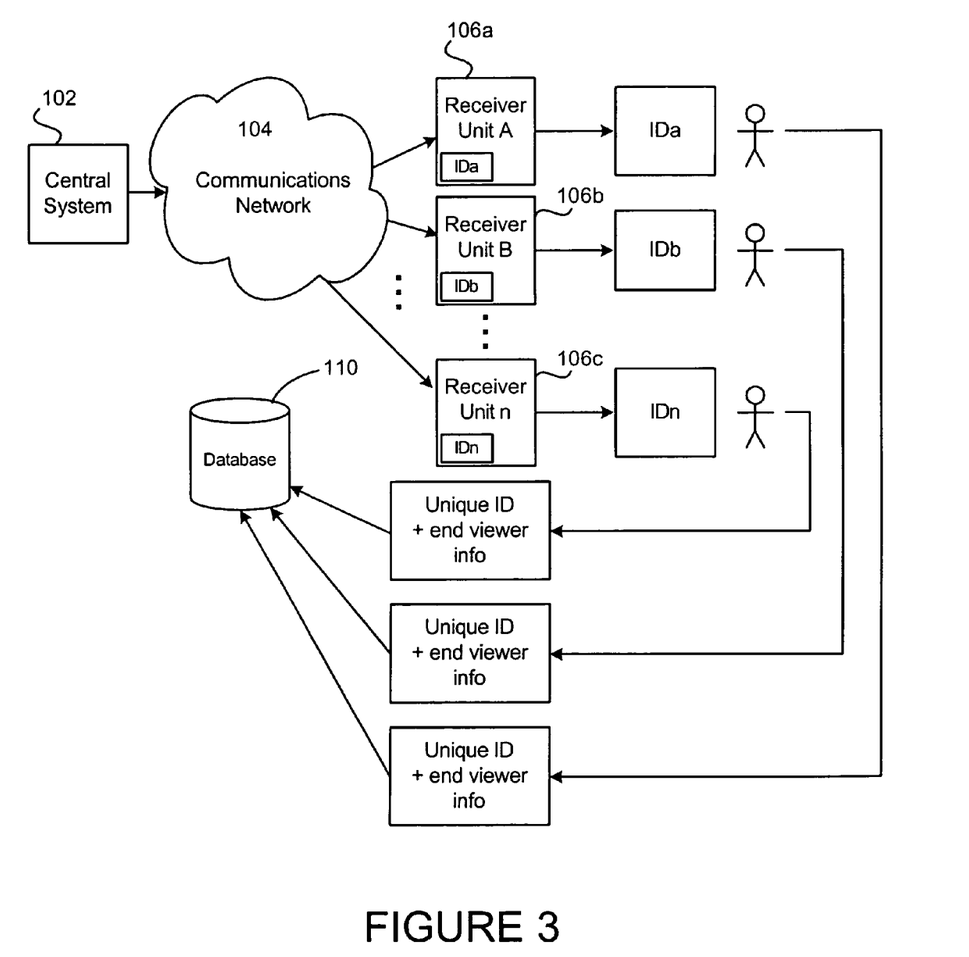
FIG. 3 is a block diagram of an exemplary method for maintaining an association between a distribution device and a common end viewer characteristic in accordance with an embodiment of the invention.

FIG. 3 illustrates the provision of information by end viewers. The central system 102 instructs the receiver units 106 to display their unique IDs. In turn, each receiver unit displays its unique ID to the end viewers that it serves. The end viewers record the unique ID and provide the unique ID along with the requested information to the central database 110. In some embodiments the information is validated prior to being stored in the database. In other embodiments, the information is stored in the database and if the information is later determined to be erroneous is deleted or modified. Similarly, the information provided by the head end technician can also be validated either before or after it is stored in the database.

In one embodiment, an external source or third party, such as Nielsen Media Research, the US Postal Service or Melissa Data, is used to verify the data. For example, in the embodiment where the receiver unit is associated with one or more geographic areas identified by zip codes, a database such as that provided by Nielsen can be used for validation. The Nielsen database provides a list of all of the zip codes served by a particular cable head end. However, one problem with the Nielsen database is that the data is not always current. It is the inventors' understanding that the Nielsen database relies largely on manual updating. For example Nielsen analysts periodically contact cable providers to determine the geographic areas served by the providers. Typically, the geographic areas are defined by boundary and zip codes. Although some cable providers are contacted every six weeks, other cable providers are only contacted every six months, while still other cable providers are only contacted every twelve months. It is the inventors' understanding that Nielsen has audience measurement boxes installed in selected homes to monitor viewing habits and to collect demographic data, but that no geographic information is collected from the audience measurement boxes or the end viewers.

If the information provided by the end viewer is inconsistent with the information provided by an external source, then the inconsistency can be resolved in various ways. The information from the external source can override the information provide by the end viewer or a manual verification process can be used to resolve the inconsistency.

Alternatively, or in addition, a graphical interface or tool can be used to verify the information. Additional information on the graphical interface is provided in the section entitled Graphical Interface. The graphical interface visually illustrates the geographic areas served by the various receiver units. For example, all areas served by a single receiver unit could be identified by a particular color. One could use the graphical tool to identify geographic areas associated with a receiver unit that appear to be incorrect. For example, typically a single receiver unit serves a number of geographic areas that are proximate to one another. If the graphical tool illustrates that the receiver unit services a geographic area that is remote from the other areas that it serves, then that is an indication that the remote geographic area has been added or associated with the receiver unit in error.

Creating Targeted Programming

The associations between the receiver units and the end viewer characteristics stored in the database support targeted programming. Targeted programming is programming that is determined, at least in part, by the end viewer characteristics. One objective of targeted programming is to provide programming that is particularly relevant to end viewers. Targeted programming allows different versions of a program or entirely different programs to be provided by different receiver units simultaneously. The programming can be received from the central system or can be created by the receiver unit.

Figure 4:
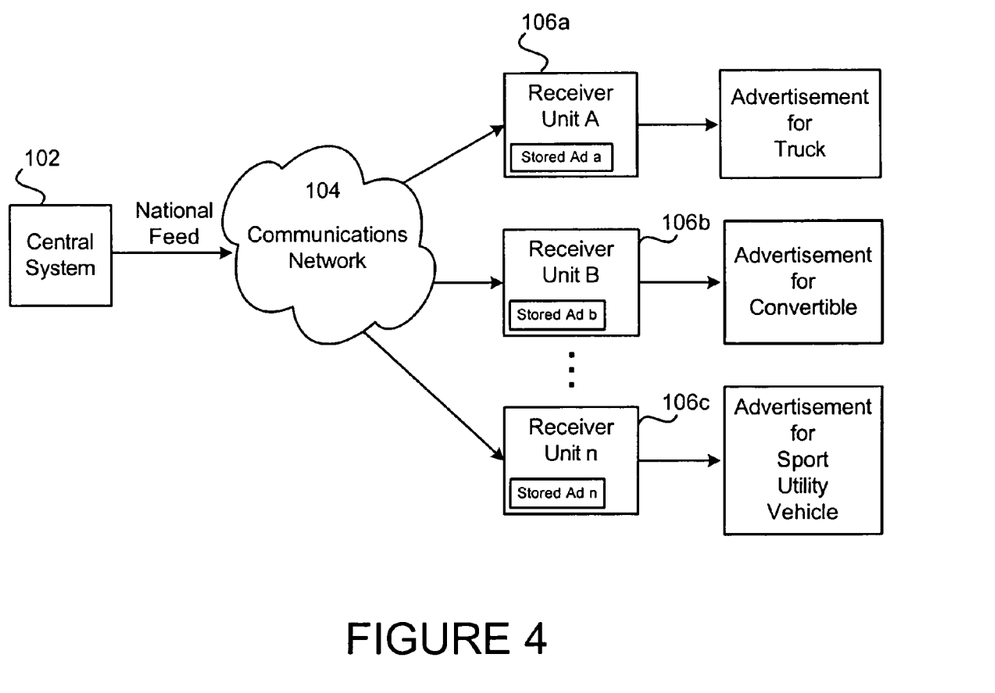
FIG. 4 is a block diagram illustrating the delivery of targeted information in accordance with an embodiment of the invention.

FIG. 4 illustrates an example of a copy split which is a targeted advertisement. In this example, the central system transmits various versions of an advertisement for a vehicle manufacturer. Each receiver unit stores a version of the advertisement. Various methods can be used to determine which version of the advertisement to store, including addressing versions to particular receiver units or providing information along with each version that permits the receiver units to determine which version to store. Other methods can also be used. Some exemplary methods are described in PCT Published Application PCT/US97/17412 entitled "Multimedia Information Transmission and Distribution System" and U.S. patent application Ser. No. 10/100,326 entitled "Methods and Apparatus for Providing National and Local Content Using Autonomous Local Control," each of which is incorporated herein by reference.

In response to an instruction from the central unit, the receiver units display the stored advertisement. The instruction can be a real time instruction or can instruct the receiver units to display the advertisement at a future time. As illustrated by FIG. 4, a first receiver unit displays an advertisement for a truck, while a second receiver unit displays an advertisement for a convertible and a third receiver unit displays an advertisement for a sport utility vehicle. In one embodiment that maintains an association between receiver units and geographic areas, the vehicle manufacturer selects the geographic areas that should receive the different versions of the advertisement. For example, the vehicle manufacturer could select one or more geographic regions in the Midwest to receive the version advertising the truck, while geographic regions in the northeast receive the version advertising the sport utility vehicle and geographic regions along the west coast receive the version advertising the convertible. The vehicle manufacturer could select these regions using the graphical interface described in more detail in the following section. Alternatively, the vehicle manufacturer could select these regions by providing other geographic parameters, such as zip codes or a list of states.

Although FIG. 4 illustrates that the advertiser predetermines which areas receive which versions of the advertisement, it is also possible to have the receiver unit determine the version of the advertisement based on local conditions. For example, the receiver units could store a number of advertisements that correspond to different local conditions, such as an advertisement for a heating system, an advertisement for a cooling system, an advertisement for a snow blower and an advertisement for rain gutters. At a predetermined time, each receiver unit provides one of the advertisements to its end viewers. Each receiver unit determines the advertisement to select based on information received from the central system. The central system determines which geographic areas are experiencing cold weather, which geographic areas are experiencing hot weather, which geographic areas are experiencing heavy snowfall, and which geographic areas are experiencing heavy rainfall. The central system then determines which receiver units serve those geographic areas and instructs the receiver units accordingly. In this manner, advertisements are presented to the end viewers that are relevant to the current weather, rather than advertisements that are merely seasonal.

Alternatively, the receiver unit can create targeted programming. The receiver units can create targeted programming in response to a command received from the central system or at a predetermined time. In one embodiment, the receiver units create a local weather forecast for delivery to the end viewers. In this embodiment, it is important that the areas served by a receiver unit be proximate to one another so that the forecast is relevant to all of the viewers served.

Targeted programming can also be created based on demographic information. For example, if a receiver unit serves end viewers that include a large number of children, then more children's programming can be provided by that receiver unit than by a receiver unit that serves end viewers that do not include as many children.

Graphical Interface

Figure 5:
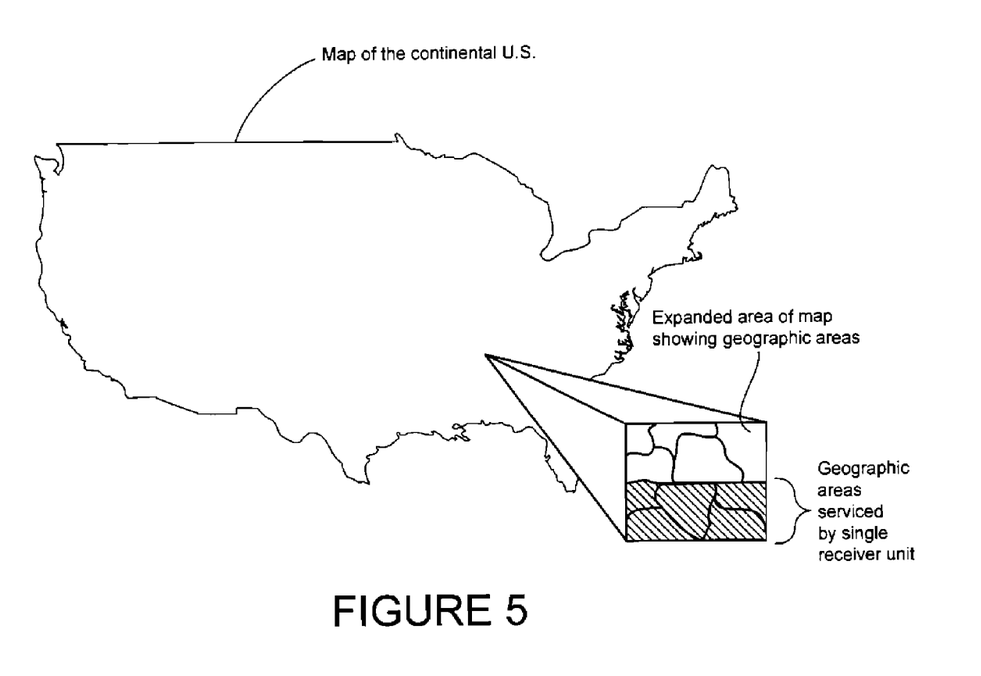
FIG. 5 illustrates an exemplary graphical interface in accordance with an embodiment of the invention.

In one embodiment, a graphical interface that displays the associations between the receiver units and the end viewer characteristics is provided. For the embodiment where the database maintains an association between the receiver units and the geographic areas served, the graphical interface includes a map. Different colors or other indicia identify the areas served by a particular receiver unit. For example, FIG. 5 illustrates a graphical interface that displays a map of the continental United States. The expanded area of the map shows a number of geographic areas. One receiver serves some of the geographic areas in the expanded area (the shaded areas) and another receiver serves the remaining geographic areas in the expanded area (the un-shaded areas). The graphical interface supports the graphical selection of a group of geographic areas for targeted programming or copy splits. For example, a content provider could select a first group served by one or more receiver units to receive certain programming, while selecting a second group served by other receiver units to receive different programming. The programming includes short-form programming, long-form programming and promotions. In addition, the programming includes crawls and logos that appear simultaneously with other programming.

The selections of the areas or groups of areas could be made graphically by selecting the desired regions using a mouse or other input device to select the desired regions from a display device. Once the areas or groups of areas are selected, then the database is used to determine the receiver units that correspond to the selected areas so that the central system can provide the targeted programming.

As discussed above, the graphical interface can be used to validate information received from technicians or end viewers. The graphical interface illustrates the areas served by each receiver unit. If a receiver unit serves an area that is remote from the other areas that it serves, then the outlying area is readily identifiable using the graphical interface.

The graphical interface can be used to determine whether receiver units should be reassigned to better serve end viewers. If at any time, it is determined that the end units served by a receiver unit should be reassigned, then the end units are reassigned and the database is updated. It may be particularly useful to reassign end units so that the geographic areas served by a receiver unit do not extend too far or the end viewers served share a common characteristic. In this manner the programming provided to the end viewers can be targeted to their geographic area or shared characteristic. For example, if the targeted programming is based on local weather conditions, then by having the receiver unit serve a particular geographic region, the programming is relevant to each end viewer.

In addition, the graphical interface can be used to support customer service. If a number of end viewers comment on the programming or service received, then the location of the end viewers can be compared to the graphical interface to determine whether the comments are directed to a single receiver unit. If the comments are related to problems with service, then the graphical interface can assist in identifying a receiver unit that may require servicing.

Although the foregoing description uses geographic areas as an exemplary end viewer characteristic, it will be apparent to those skilled in the art that the invention applies to any demographic or characteristic. Moreover, the invention is not limited to the use of a receiver unit in a cable television head end. Other types of devices, including any type of network distribution devices, set top boxes and satellite receivers can also be used in connection with the invention.

What is claimed is:

1. A system for determining at least one geographic area served by each of a plurality of receiver units, comprising:
    a central system, including a processor and a memory, for distributing national content to the plurality of receiver units and for instructing the receiver units to generate local content, wherein the central system instructs the receiver units to generate local content that includes a unique ID associated with the receiver unit providing the local content; and
    the plurality of receiver units, each receiver unit serving at least one geographic area wherein each receiver unit generates local content that displays the unique ID associated with the receiver unit to a plurality of end viewers served by the receiver unit;
    wherein the central system receives from a subset of the end viewers served by the receiver units communications identifying the unique IDs that were communicated by the receiver units and the geographic areas where the unique IDs were displayed and the central system determines at least one geographic area served by each of the receiver units by associating the unique ID for each receiver unit with the geographic areas identified in the communications from the subset of the end viewers having the same unique ID, and
    wherein the central system maintains a database that associates each of the unique IDs with the at least one geographic area served by the receiver unit associated with the unique ID.

2. The system of claim 1, wherein each receiver unit delivers targeted programming to the end viewers it serves based on the geographic areas served by the receiver unit.

3. The system of claim 1 wherein the database is a central database having an entry for each receiver unit that associates the at least one geographic area served by the receiver unit with the unique ID for the receiver unit.

4. The system of claim 3 wherein the information stored in the central database for a selected receiver unit is communicated to the selected receiver unit.

5. The system of claim 1, wherein each receiver unit stores information on the at least one geographic area served by that receiver unit.

6. The system of claim 1 wherein the communications received by the central system from the subset of the end viewers are received using a different method of communication than used to communicate the unique IDs to the end viewers.

7. A method for obtaining information to determine at least one geographic area served by each of a plurality of receiver units, comprising:
    providing a unique ID for each of the receiver units;
    transmitting a request to at least a subset of a plurality of end viewers served by each receiver unit to communicate information to a central system by:
        transmitting the unique ID that identifies the receiver unit to the subset of end viewers served by the receiver unit so that the unique ID is displayable on a television to the subset of end viewers served by the receiver unit;
    at the central system:
        receiving the information from the subset of the end viewers, wherein the information received from one of the subset of the end viewers includes a particular ID displayed to the end viewer and the geographic area where the particular ID was displayed;
        based on the received information that includes the particular ID, identifying at least one geographic area served by the receiver unit having the particular ID, and
        maintaining a database that associates the particular ID with the at least one geographic areas served by the receiver unit having the particular ID.

8. The method of claim 7, wherein the geographic areas are identified by zip codes.

9. The method of claim 7, further comprising:
    displaying a map that identifies the at least one geographic areas served by the receiver unit having the particular ID.

10. The method of claim 7, further comprising:
    using the at least one geographic area served by the receiver unit having the particular ID to identify demographic information associated with the at least one geographic area and
    associating the demographic information with the receiver unit having the particular ID.

11. The method of claim 7, wherein requesting that each end viewer communicate information, comprises:
    requesting that each end viewer provide the information via a communications means selected from the group consisting of: a web site, telephone, mail and e-mail.

12. The method of claim 7, further comprising:
    providing targeted programming to the end viewers served by the receiver unit having the particular ID based on the at least one geographic area served by the receiver unit.

13. The method of claim 7 wherein the information received at the central system from the subset of the end viewers is received using a different method of communication than used to transmit the unique ID to the end viewers.

14. A computer-readable storage medium having stored thereon computer executable instructions, said instructions comprising instructions for:
    instructing a plurality of receiver units to generate local content to a plurality of end viewers, wherein the local content includes a unique ID associated with the receiver unit providing the local content;

receiving from a subset of the end viewers served by the receiver units communications identifying the unique IDs that were communicated by the receiver units and the geographic areas where the unique IDs were displayed;

determining at least one geographic area served by each of the receiver units by associating the unique ID for each receiver unit with the geographic areas identified in the communications from the subset of the end viewers having the same unique ID; and maintaining a database that associates each of the unique IDs with the at least one geographic area served by the receiver unit associated with the unique ID.

15. The computer-readable storage medium of claim 14 wherein the communications received from the subset of the end viewers is received using a different method of communication than used to transmit the unique ID to the end viewers.

16. The computer-readable storage medium of claim 14 further comprising instructions for:

for a selected one of the receiver units associated with a select ID, using the database entry for the selected receiver unit and communicating the at least one geographic area associated with the select ID to the selected receiver unit.

17. The computer-readable storage medium of claim 14, wherein the geographic area where the unique ID was displayed is identified using a zip code.

* * * * *